June 10, 1952  J. F. RUDE ET AL  2,600,332

ROTARY HOE WHEEL

Filed Aug. 31, 1949

INVENTORS
JOHN F. RUDE
ALVAN V. BURCH
By Toulmin & Toulmin
ATTORNEYS

Patented June 10, 1952

2,600,332

UNITED STATES PATENT OFFICE 2,600,332

ROTARY HOE WHEEL

John F. Rude and Alvan V. Burch, Evansville, Ind., assignors to Burch Plow Works, Inc., Evansville, Ind., a corporation of Indiana Application August 31, 1949, Serial No. 113,316

3 Claims. (Cl. 97—212)

This invention relates to rotary hoes, and particularly to a rotary hoe wheel for such rotary hoes.

An object of the invention is to provide a rotary hoe wheel that will produce a more satisfactory cultivation of soil.

While the primary purpose of a cultivator is to break the soil surface to provide a loose ground mulch 1½" to 2" in depth, yet cultivators produce this general result in varying degrees of success. The problem is to produce a cultivator that will break the ground surface into a very fine mulch without damaging crops over which the cultivator moves.

It is the purpose of a rotary hoe to move the rotary hoe apparatus over a planted field without regard to rows of plantings so that the ground surface will be broken into a mulch.

Prior rotary hoes had certain definite disadvantages in that crop damage was substantially in the use of rotary hoes and they did not produce a thorough working of the soil surface to a fine soil mulch. In many instances, the teeth spacing was either too great or too small, in the former case of which the teeth had a tendency to merely walk over the ground, while in the latter case the teeth endeavored to produce narrow trenches in the ground.

Also, the teeth of many of the former rotary hoe wheels were shaped in such a manner that they inherently caused a slight packing of the ground under each of the teeth as the hoe wheel moved over the ground, which produced an unsatisfactory condition even though such hoe wheels were more satisfactory than disc cultivators for many kinds of work.

It is therefore an object of this invention to provide a rotary hoe wheel for use in a rotary hoe cultivator that will produce a more satisfactory mulching of the ground surface and a finer break-up of the ground.

It is still another object of the invention to provide a rotary hoe wheel that will produce no packing of the ground by running of the teeth on the ground.

Still another object of the invention is to provide a rotary hoe wheel that will reduce crop damage to a minimum when the rotary hoe is run over planted ground.

Another object of the invention is to provide a rotary hoe wheel in which straight teeth are used and which are set at a determined, rather critical angle relative to the diameter of the hoe wheel to produce maximum satisfactory results, and which hoe wheel is of a determined size to give the results desired.

Further objects and advantages will become apparent from the drawings and the following description.

Figure 1:
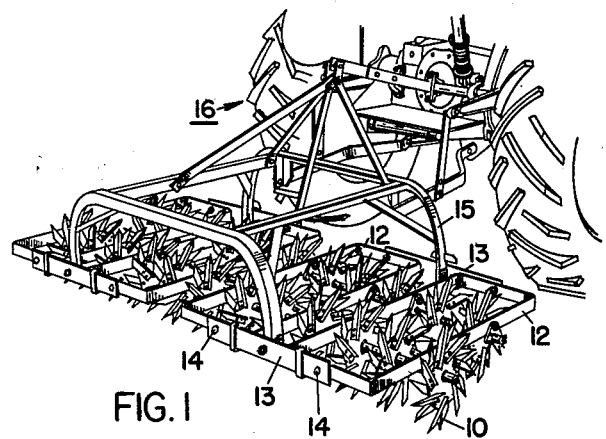
Figure 1 is a perspective elevational view of a rotary hoe incorporating rotary hoe wheels of this invention.
Figure 2:
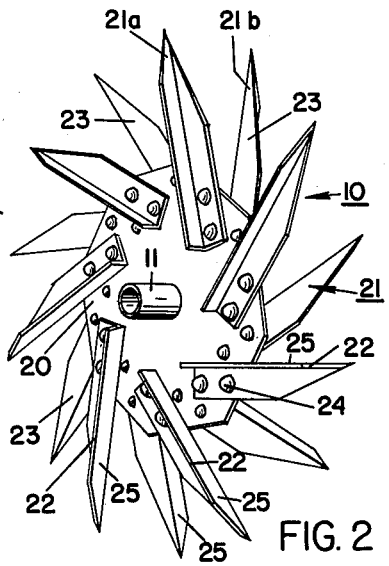
Figure 2 is a perspective elevational view of the rotary hoe wheel of this invention.

The rotary hoe wheel 10 of this invention is adapted for use in a rotary hoe cultivator of the general type illustrated in Figure 1.

The rotary hoe wheels 10 are each provided with a hub 11 by which the rotary hoe wheels are supported on shafts carried on the cultivator frames 12. The cultivator frames 12 are pivotally secured to frame members 13 on pivots 14, and the frame members 13 are in turn carried on a lift frame 15 which is attached to a tractor 16.

Figure 4:
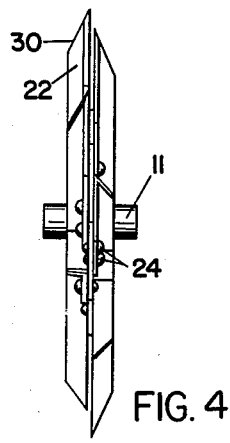
Figure 4 is an edge view of the rotary hoe wheel.

Each of the rotary hoe wheels 10 consists of a hub plate 20 to which the hub 11 is secured. The hub 11 consists of a tube that extends through the hub plate 20 so that it projects from each side of the hub plate, as illustrated in Figure 4.

To the hub plate 20 there is secured a plurality of teeth 21 that are made of metal angle, preferably steel. The teeth 21 consist of the two series 21a and 21b that are placed on opposite sides of the hub plate 20. Also, sequential teeth of the series 21a and 21b are placed on alternate sides of the hub plate 20 so that no two consecutive teeth will enter the ground in direct alignment with one another.

The teeth 21 are all formed of straight angle metal so that each tooth consists of webs 22 and 23, the web 22 being provided with a flat working face 25, the web 23 of each of the teeth being placed against the hub plate 20, suitable rivets 24, or other fastening means being provided to secure the teeth 21 to the hub plate 20.

We have discovered that the angular positioning of the teeth 21 on the hub plate 20 is the determining factor in providing a rotary hoe wheel that will produce a fine mulching of ground surface over which the wheel works, and that this angular positioning is critical within certain limits beyond which a definite change in the satisfactory operation of the wheel is clearly noticeable. We have also discovered that the diameter of the hoe wheel is critical within limits to obtain the most satisfactory operation of the wheel, and that the number of teeth on the wheel is also critical.

The rotary hoe wheel illustrated in the drawings has been determined to be that which gives the most satisfactory mulching. This rotary hoe wheel is provided with seven teeth on each side of the hub plate 20, consecutive teeth being placed on opposite sides of the hub plate and evenly distributed about the periphery of the hub plate. The number of teeth cannot be varied more than plus or minus one tooth on each side of the hub plate. If the number of teeth is increased beyond this limit, a trench-digging effect will be produced by the hoe wheel, and if the teeth are reduced below the limit, the wheel will merely walk across the ground on the field without any suitable breaking of the soil.

Also, we have discovered that the outer peripheral diameter of the rotary hoe wheel is critical within plus or minus 1", the most satisfactory operation being obtained with a rotary hoe wheel that is 15" in diameter.

However, we have discovered that the angular positioning of the teeth on the hub plate is the most critical factor in that if the angle is too near radial there will be an ineffective penetration of the teeth into the soil, whereas if the angle is too acute, there will be a trench-digging effect of the hoe wheel with very slight penetration of the teeth into the soil.

We have discovered that the angular relationship between the working faces of consecutive aligned teeth shall be such that lines longitudinal of the teeth will intersect on the periphery of a circle described about the axis of the wheel that is substantially one-fourth the radius of the hoe wheel, and that the angular relationship can change within limits so long as the intersection of the lines longitudinal of the working faces of the teeth intersect on the periphery of a circle whose radius is not more than 30% of the radius of the hoe wheel nor less than 20% of the radius of the hoe wheel, but that most satisfactory operation is obtained when the intersection of the lines occurs on the periphery of a circle that is substantially one-fourth the radius of the hoe wheel.

Figure 3:
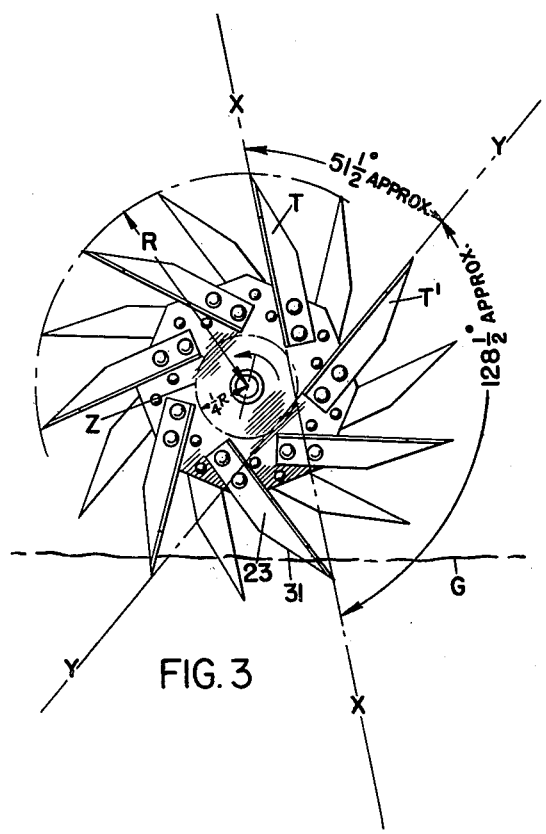
Figure 3 is a face view of the rotary hoe wheel.

In Figure 3 the lines X—X and Y—Y are longitudinal of the working faces of consecutive teeth 21. It will be noted that the intersection of these lines occurs on the periphery of the circle Z which has a radius one-fourth the radius of the hoe wheel, R representing the radius of the outer periphery of the hoe wheel as scribed by the ends of the teeth 21. Thus, the teeth T and T¹, see Figure 3, will be disposed relative to each other at an acute angle of 51½° approximate with a supplemental angle of 128½° approximate. Carrying this one step further, the ends of consecutive teeth 21, such as T and T¹ will be disposed about the periphery of the circle scribed by the ends of the teeth approximately 51½° apart.

As previously stated, the teeth on either side of the hoe wheel can be increased by 1 or decreased by 1 as outside limits, thus placing the ends of the teeth, according to increase or decrease of the number of teeth either approximately 5° farther apart or approximately 5° closer together. However, the angular relationship of the working faces of consecutive teeth shall remain such that longitudinal lines across the working faces shall intersect on the periphery of a circle scribed about the axis of a whel that has a radius substantially one-fourth the radius of the wheel, plus or minus 5%, as previously described.

With the angular relationship of the teeth 21 established as heretofore described, and with the number of teeth placed on each side of the hoe wheel being 7, plus or minus 1, it will be noted that there will be at all times at least three teeth working on the ground surface G at any one time.

Further, it will be noted that the teeth entering and in the ground surface constantly change their angular relationship to the ground surface, thereby causing a continuous breaking action in the soil to produce a fine mulching. This fine mulching, however, can be occasioned only when the hoe wheel is retained at a diameter of substantially 15", plus or minus 1" as previously stated, for if the diameter of the hoe wheel is increased greatly, the number of teeth that simultaneously work upon the soil will be reduced to two or even one tooth, which would produce ineffective soil mulching. On the other hand, if the diameter of the hoe wheel is substantially reduced, too great a number of teeth engage the soil causing a trench-digging action by the teeth rather than a soil mulching.

Each of the teeth 21 have the webs 22 and 23 cut off to form a tapered point on each of the teeth. The tapered edge 30 of web 22 has a length equal to substantially twice the width of the angle metal of which the tooth is constructed while the tapered edge 31 of the web 23 has a length that may vary within limits of 30 to 40% of the radius of the hoe wheel. The tapered edge 31 is thus sufficiently steep that the edge will not coincide with the arc of rotation of the wheel at any time, thus avoiding packing of the ground by the edge 31 after it has once been broken up by the working face of the tooth.

While the hoe wheel disclosed and described herein constitutes a preferred form of the invention, yet it will be understood that it is capable of structural alteration without departing from the spirit of the invention, and that modifications that fall within the scope of the appended claims are intended to be included herein.

Having thus fully described our invention, what we claim as new and desire to secure by Letters Patent is:

1. A rotary hoe wheel comprising a hub, a hub plate secured thereto, two series of teeth arranged on opposite sides of said hub plate and fixedly secured thereto, said teeth comprising straight, angle metal members having an elongated sharp-pointed end portion for penetration into the soil, one series of teeth being arranged in alternation to those of the other series, each series of teeth being angularly spaced about said hub plate, the angular spacing between the working faces of consecutive aligned teeth being such that lines extending longitudinally of the teeth along the working face thereof intersect on the periphery of a circle prescribed about the axis of said wheel, the radius of said circle being substantially one-fourth the radius of said wheel, and wherein the arc sector between said intersecting lines of consecutive teeth in each series is about 51½°.

2. A rotary hoe wheel comprising a hub, a hub plate secured thereto, two series of teeth arranged on opposite sides of said hub plate and fixedly secured thereto, said teeth comprising straight, angle metal members having an elongated sharp-pointed portion for penetration into the soil, one series of teeth being arranged in alternation to those of the other series, each series of teeth being angularly spaced about said hub plate, the angular spacing between the working faces of consecutive aligned teeth being such that lines extending longitudinally of the teeth along the working face thereof intersect on the periphery of a circle prescribed about the axis of said wheel, the radius of said circle being substantially one-fourth the radius of said wheel.

3. In a rotary hoe wheel cultivator for mulching soil and which hoe wheel comprises a hub and hub plate secured thereto and two series of teeth arranged on opposite sides of said hub plate and fixedly secured thereto, one series of teeth being arranged in alternation to those of the other series and wherein each series of teeth are angularly spaced about said hub plate, the improvement which consists in the provision of straight, angle teeth, said teeth having an elongated tapered edge terminating in a sharp-pointed portion for penetration into the soil, said teeth numbering seven in each series, the teeth being spaced angularly about said hub plate at equal distances, and wherein said teeth are positioned so that lines extending longitudinally of the teeth along the working face thereof intersect on the periphery of a circle prescribed about the axis of said wheel, the radius of said circle being about one-fourth the radius of said wheel.

JOHN F. RUDE.
ALVAN V. BURCH.

REFERENCES CITED

The following references are of record in the file of this patent:

UNITED STATES PATENTS

| Number | Name | Date |
|---|---|---|
| 658,460 | Nubar | Sept. 25, 1900 |
| 1,845,936 | Rude | Feb. 16, 1932 |

FOREIGN PATENTS

| Number | Country | Date |
|---|---|---|
| 666,367 | France | May 18, 1929 |
| 554,033 | Great Britain | June 16, 1943 |